United States Patent
Nahidipour

(10) Patent No.: US 8,811,930 B2
(45) Date of Patent: Aug. 19, 2014

(54) WIRELESS PERIPHERAL DEVICE POWERED BY HARVESTED POWER GENERATED BY WIRELESS COMMUNICATION

(75) Inventor: Aram Nahidipour, Laguna Niguel, CA (US)

(73) Assignee: Broadcom Corporation, Irvine, CA (US)

( * ) Notice: Subject to any disclaimer, the term of this patent is extended or adjusted under 35 U.S.C. 154(b) by 289 days.

(21) Appl. No.: 13/173,937

(22) Filed: Jun. 30, 2011

(65) Prior Publication Data

US 2013/0005249 A1    Jan. 3, 2013

(51) Int. Cl.
*H04B 1/16*    (2006.01)

(52) U.S. Cl.
USPC ............ 455/343.1; 455/127.1; 455/573; 455/522; 340/572.1

(58) Field of Classification Search
USPC .......... 455/343.1, 127.1, 573, 522, 13.4, 572, 455/41.2; 340/572.1, 539.26; 235/383, 385
See application file for complete search history.

(56) References Cited

U.S. PATENT DOCUMENTS

| | | | |
|---|---|---|---|
| 7,400,253 B2 * | 7/2008 | Cohen | 340/572.1 |
| 7,403,120 B2 * | 7/2008 | Duron et al. | 340/572.1 |
| 8,237,548 B2 * | 8/2012 | Fay et al. | 340/10.1 |
| 2007/0064942 A1 * | 3/2007 | Talty et al. | 380/232 |
| 2007/0109116 A1 * | 5/2007 | Burr | 340/539.12 |
| 2007/0109121 A1 * | 5/2007 | Cohen | 340/539.26 |
| 2008/0074254 A1 * | 3/2008 | Townsend et al. | 340/539.11 |
| 2008/0100423 A1 * | 5/2008 | Geissler et al. | 340/10.1 |
| 2009/0167484 A1 * | 7/2009 | Burr | 340/3.31 |
| 2009/0218891 A1 * | 9/2009 | McCollough, Jr. | 307/154 |
| 2010/0051692 A1 * | 3/2010 | Knudson et al. | 235/439 |
| 2010/0308794 A1 * | 12/2010 | Townsend et al. | 324/103 P |
| 2011/0291802 A1 * | 12/2011 | Fay et al. | 340/10.1 |
| 2012/0086285 A1 * | 4/2012 | Hyoung et al. | 307/104 |
| 2012/0185192 A1 * | 7/2012 | Townsend et al. | 702/64 |
| 2012/0306438 A1 * | 12/2012 | Howard et al. | 320/107 |
| 2012/0311555 A1 * | 12/2012 | Nijenkamp | 717/170 |
| 2013/0109304 A1 * | 5/2013 | Marcu et al. | 455/41.1 |
| 2013/0132032 A1 * | 5/2013 | Mckeown | 702/182 |

* cited by examiner

*Primary Examiner* — Minh D Dao
(74) *Attorney, Agent, or Firm* — Sterne, Kessler, Goldstein & Fox P.L.L.C.

(57) ABSTRACT

A powerless/wireless peripheral device is disclosed that engages in wireless communication such as near field communication (NFC) and/or far field communication with other communication devices capable of NFC and/or far field communication. The powerless/wireless peripheral device harvests power from the NFC and/or far field communication and operates of the harvested power eliminating the need for an internal battery and/or an external power supply. The powerless/wireless peripheral device supplements a computing device in enabling an operator to interact with the computing device. The powerless/wireless peripheral device is inexpensive, portable and easy to use.

20 Claims, 8 Drawing Sheets

WIRELESS PERIPHERAL DEVICE POWERED BY HARVESTED POWER GENERATED BY WIRELESS COMMUNICATION

BACKGROUND

1. Field of Invention

The invention relates to wireless and powerless devices, and more specifically to providing wireless communication and power harvested using magnetic and/or electric fields that are generated between the wireless communications capable devices.

2. Related Art

Typically, a communications device is associated with an integrated or external peripheral device that allows an operator to operate and/or control the communications device. For example, the peripheral device may operate as an output device that receives information, such as one or more commands and/or data, from the communications device to be provided or displayed to the operator. The peripheral device may operate as an input device to provide information, such as one or more commands and/or data, from the operator to the communications device. The peripheral device generally derives its power from internal batteries of the communications device. Power may flow, for example, through a power cable connecting the peripheral device to the communications device. The peripheral device may also derive its power from an internal and/or an external power supply associated with the peripheral device.

Operation of the communications device in the manner described above limits the operator to using the peripheral device that is powered by the internal batteries of the communications device. For example, operation of a wireless phone is limited to using the keypad of the wireless phone that receives its power from the wireless phone. The operator cannot user a larger keypad in operating the wireless phone.

Operation of the communications device in the manner described above also limits the operator to the conventional peripheral device that is powered from an internal and/or an external power supply for the peripheral device. For example, a conventional wireless peripheral device with its own internal battery may quickly drain the power of the internal battery. In a further example, a conventional peripheral device with its own external power supply requires that the conventional peripheral device be connected to the external power supply limiting the operation of the communications device.

BRIEF DESCRIPTION OF THE DRAWINGS/FIGURES

Embodiments of the invention are described with reference to the accompanying drawings. In the drawings, like reference numbers indicate identical or functionally similar elements. Additionally, the left most digit(s) of a reference number identifies the drawing in which the reference number first appears.

Figure 1:
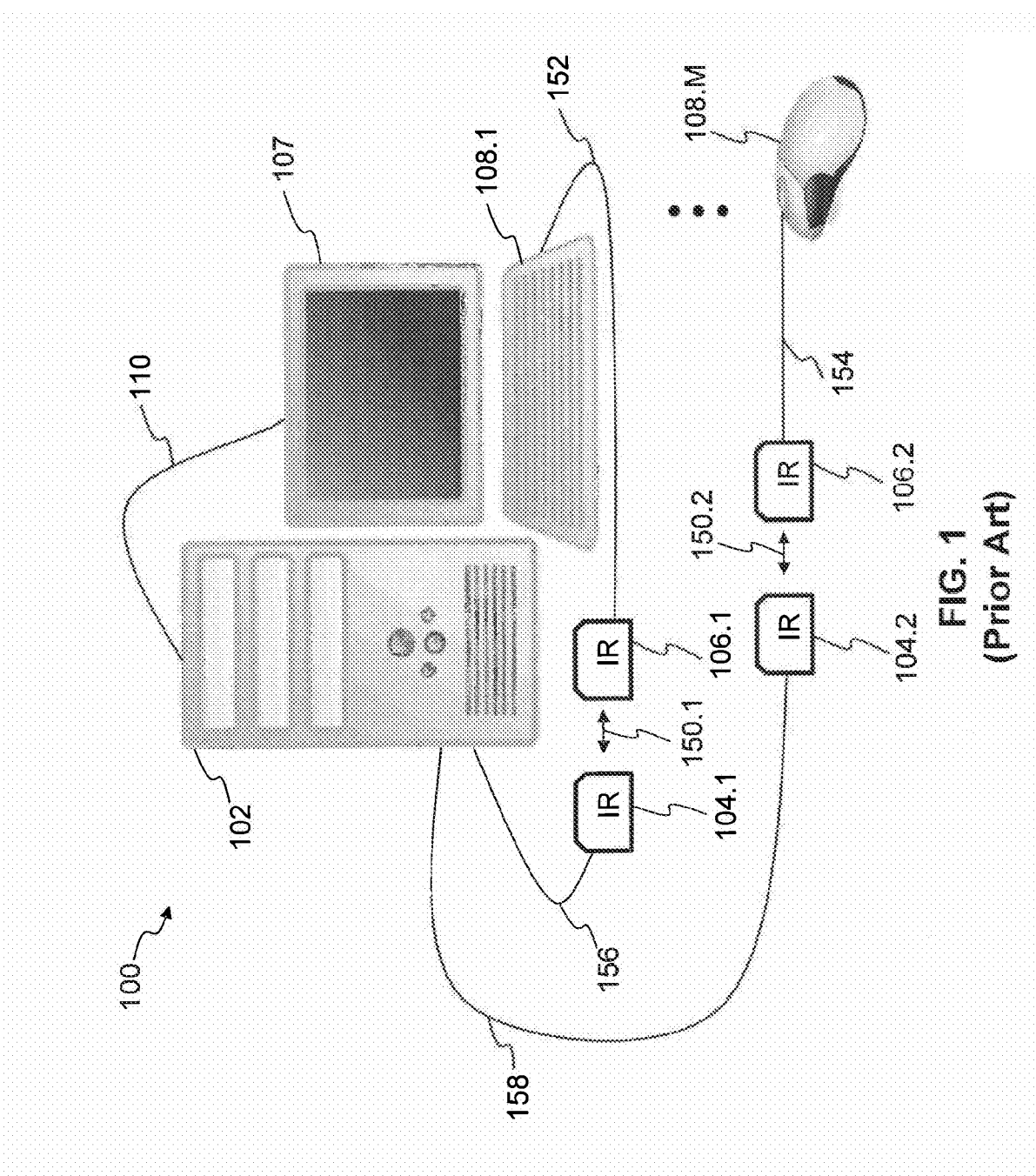
FIG. 1 illustrates a computing environment.

The invention will now be described with reference to the accompanying drawings. In the drawings, like reference numbers generally indicate identical, functionally similar, and/or structurally similar elements. The drawing in which an element first appears is indicated by the leftmost digit(s) in the reference number.

DETAILED DESCRIPTION OF THE INVENTION

The following Detailed Description refers to accompanying drawings to illustrate exemplary embodiments consistent with the invention. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to effect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the invention. Therefore, the Detailed Description is not meant to limit the invention. Rather, the scope of the invention is defined only in accordance with the following claims and their equivalents.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

The following Detailed Description of the exemplary embodiments will so fully reveal the general nature of the invention that others can, by applying knowledge of those skilled in relevant art(s), readily modify and/or adapt for various applications such exemplary embodiments, without undue experimentation, without departing from the spirit and scope of the invention. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

An Exemplary Powered Wireless Perihperal Device System

FIG. 1 illustrates a conventional computing environment 100 that uses IR communications between a computer and one or more peripheral devices. The computing environment 100 is shown with a computer 102 engaged in wireline communication with peripheral device 107 and engaged in IR communication with battery powered peripheral devices 108.1 through 108.M. The computing environment 100 includes: the computer 102; AC powered peripheral device 107, battery powered peripheral devices 108.1 through 108.M; and IR transceivers 104.1, 104.2, 106.1, and 106.2.

As shown in FIG. 1, the computer 102 is coupled to the IR transceivers 104.1 and 104.2. The IR transceivers 104.1 and 104.2 communicate data between the computer 102 and respective IR transceivers 106.1 and 106.2, where the IR transceiver 106.1 is coupled to the battery powered peripheral device 108.1 and the IR transceiver 106.2 is coupled to the battery powered peripheral device 108.M. The data is sent using corresponding IR signals 150.1 and 150.2.

The computer 102 receives and/or sends data to the peripheral devices 107, and 108.1-M when performing services for an operator. For example, the computer 102 represents a desktop computer in which the computer 102 provides services that include computing capabilities. AC powered peripheral device 107 represents a computer monitor that displays information resulting from the computing services provided by the computer 102. Battery powered peripheral device 108.1 represents a keyboard that enables an operator to input information into the computer 102. The battery powered peripheral device 108.M represents a mouse that further enables the operator to input information into the computer 102.

The computer 102 communicates with the AC powered peripheral device 107 through a communication cable 110 by transmitting and receiving communication signals that carry data through a communication cable 110.

The computer 102 communicates with the battery powered peripheral devices 108.1 and 108.M through IR communication. Those skilled in the relevant art(s) will recognize that IR communication is a short-range communication among computers and peripheral devices. IR communication capable devices use infrared light-emitting diodes (LEDs) to emit infrared radiation which is focused by a plastic lens into a narrow beam. The beam is modulated to encode the data. The receiver uses a silicon photodiode to convert the infrared radiation to an electric current. It responds only to the rapidly pulsing signal created by the transmitter, and filters out slowly changing infrared radiation from ambient light.

For example, the computer 102 engages the battery powered peripheral device 108.1 in IR communication. The operator inputs data into the battery powered peripheral device 108.1, where the peripheral device 108.1 represents a keyboard by entering key strokes into the battery powered peripheral device 108.1. The data inputted into the battery powered peripheral device 108.1 is sent to the peripheral IR transceiver 106.1 over data line 152. The peripheral IR transceiver 106.1 receives the data and encodes the data by modulating the data onto an IR beam 150.1. The IR beam 150.1 is received by the IR transceiver 104.1, where the IR transceiver 104.1 demodulates the data from the IR beam 150.1. The IR transceiver 104.1 sends the demodulated data to the computer 102 over data line 156. The computer 102 receives the data and processes the data.

Likewise, the computer 102 sends data to the IR transceiver 104.1 over data line 156. The IR transceiver 104.1 receives the data and encodes the data by modulating the data onto the IR beam 150.1. The IR beam 150.1 may be received by the peripheral IR transceiver 106.1, where the IR transceiver 106.1 demodulates the data from the IR beam 150.1. The peripheral IR transceiver 106.1 sends the demodulated data to the battery powered peripheral device 108.1.

Similarly, the computer 102 engages the battery powered peripheral device 108.M in IR communication. The data inputted into the battery powered peripheral device 108.M is sent to the peripheral IR transceiver 106.2 over data line 154. The peripheral IR transceiver 106.2 receives the data and encodes the data by modulating the data onto an IR beam 150.2. The IR transceiver 104.2 sends the demodulated data to the computer 102 over data line 158. The computer 102 sends data to the peripheral device 108.M in a similar manner noted above with the battery powered peripheral device 108.1.

An Exemplary IR Peripheral Device

Figure 2:
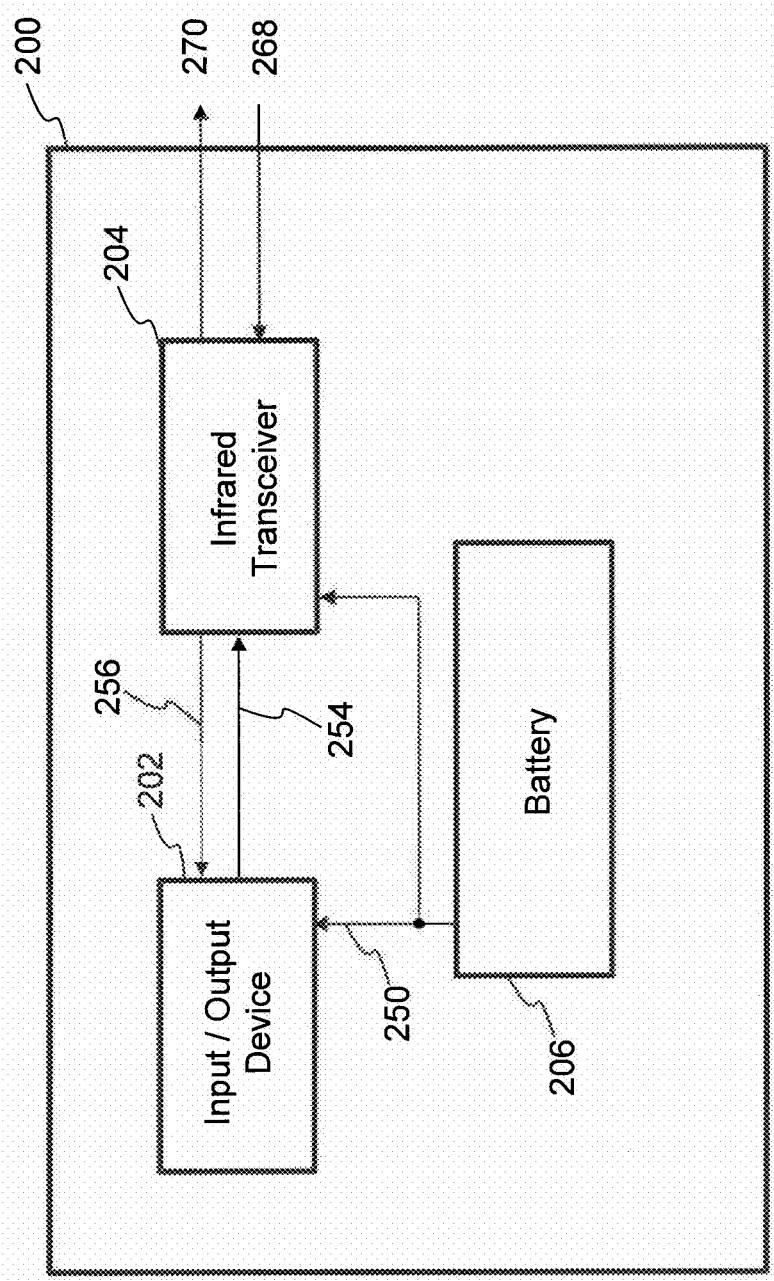
FIG. 2 illustrates a block diagram of a battery powered peripheral device.

FIG. 2 illustrates a block diagram of a conventional battery powered peripheral device 200. The battery powered peripheral device 200 engages in IR communication and is powered by a battery. The battery powered peripheral device 200 includes an input/output module 202, an infrared transceiver 204, and a battery 206.

The input/output module 202 represents a conventional input/output module such as alphanumeric keys on a keyboard or a button on a mouse which enables the operator to input data into the battery powered peripheral device 200. The input/output module 202 generates and provides peripheral data 254 to the infrared transceiver 204, based on the operator input.

The infrared transceiver 204 receives the peripheral data 254 and transmits the peripheral data 254 as transmitted data communication 270. The infrared transceiver 204 encodes the peripheral data 254 onto an infrared beam to generate the transmitted data communication 270, and then transmits the transmitted data communication 270 to a computer, such as computer 102.

During reception, the infrared transceiver 204 receives a communications signal 268 that is an infrared beam from a computer. The infrared transceiver 204 decodes peripheral data 256 from the infrared beam, and then forwards peripheral data 256 to the input/output module 202.

The battery 206 provides power to the battery powered peripheral device 200. The battery 206 may include one or more nickel-cadmium (NiCd), one or more nickel metal hydride (NiMH), and/or one or more lithium-ion (Li-ion) cells. The one or more cells of the battery 206 convert chemical energy into electrical energy via an electrochemical reaction. The battery powered peripheral device 200 may reverse the electrochemical reaction allowing the battery 206 to be restored or recharged.

The battery 206 provides a device charge 250 to the input/output module 202 and the infrared transceiver 204. The device charge 250 represents battery power provided by the battery 206 to the input/output module 202 and the infrared transceiver 204.

The battery powered peripheral device 200 engages in IR communication. However, the battery powered peripheral device 200 may also engage in other wireless communication such as: Zigbee, Bluetooth, WiFi and/or any other suitable wireless communication standard where the battery powered peripheral device is powered from a battery.

An Exemplary Powerless/Wireless Peripheral Device System

Figure 3:
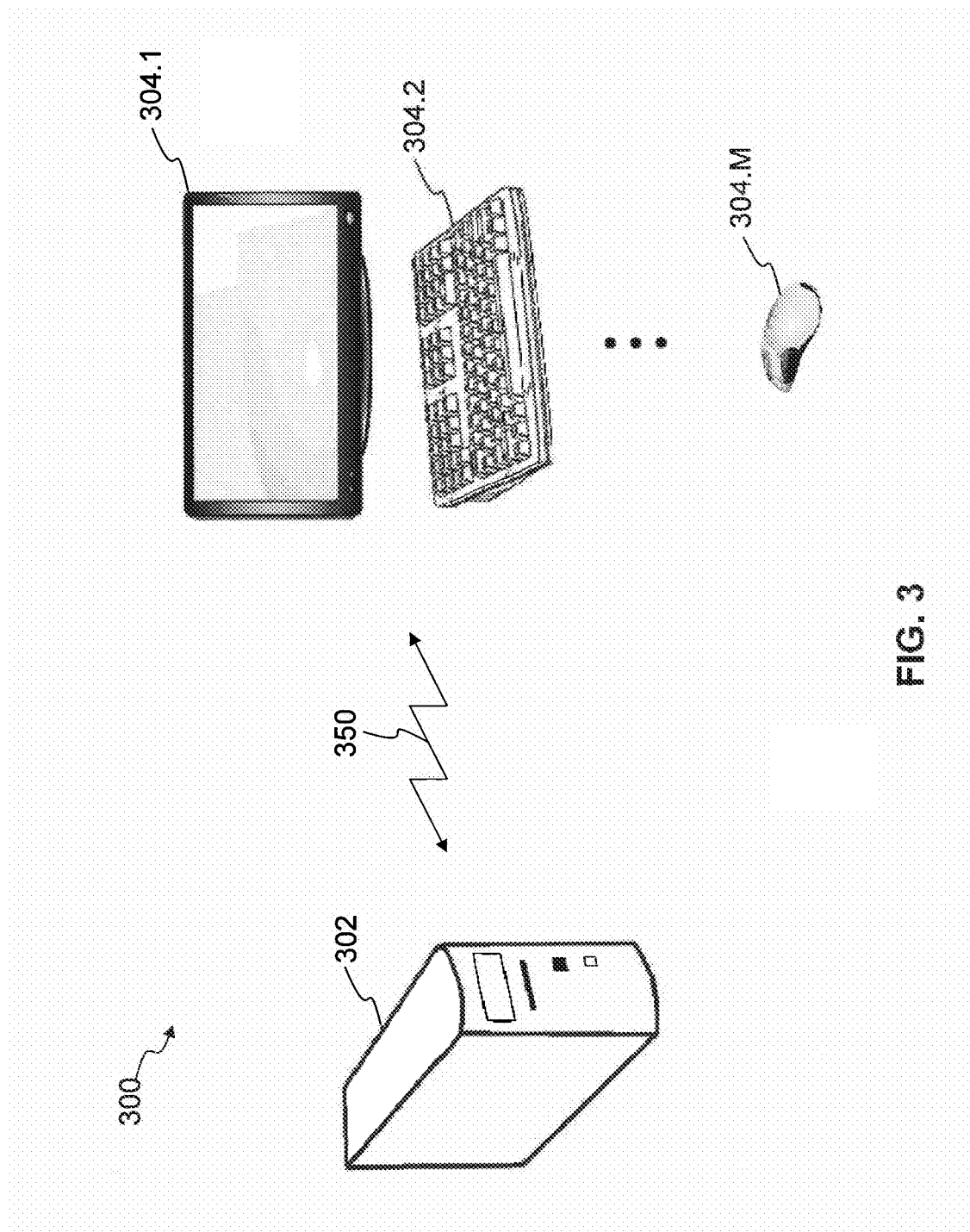
FIG. 3 illustrates a powerless/wireless peripheral device system according to an exemplary embodiment of the invention.

The present invention derives or harvests power for peripheral devices from a communication signal instead of requiring a battery. FIG. 3 illustrates a powerless and wireless (herein powerless/wireless) peripheral device system 300, according to an exemplary embodiment of the invention. The powerless/wireless peripheral device system 300 is shown with a computer 302 engaged in near field and/or far field communication 350 with powerless/wireless peripheral devices 304.1, 304.2, and 304.M.

Near field and/or far field communication 350 enables wireless communication between the computer 302 and the powerless/wireless peripheral devices 304.1 through 304.M. The near field and/or far field communication 350 also enables the powerless/wireless peripheral devices 304.1 through 304.M to receive power from the power harvested from the near field and/or far field communication 350. Accordingly, near field and/or far field communication 350 can be one or more communications 350. The powerless/wireless peripheral devices 304.1 through 304.M may engage in the wireless communication and receive harvested power from the near field and/or far field communication 350 on a single channel using a single frequency for both the wireless communication and the harvested power. Alternatively, separate channels may be used for data communication and power delivery. More specifically, the powerless/wireless peripheral devices 304.1 through 304.M may engage in the wireless communication on a first channel and using a first frequency, and harvest power using a second channel and a second frequency that is different from the first channel and the first frequency. As a result, the powerless/wireless peripheral devices 304.1 through 304.M do not require battery power.

Those skilled in the relevant art(s) will recognize that the present invention may be applicable to communication signals operating in both the near field and the far field configurations over frequency ranges that include but are not limited to: low frequency (LF), high frequency (HF), ultra-high frequency (UHF), and radio frequency (RF) without departing from the spirit and scope of the present invention. Those skilled in the relevant art(s) will recognize that the present invention may be applicable to wireless communication protocols that include Bluetooth, Zigbee, WiFi, and other applicable communications protocols.

The computer 302 may represent a mobile telephone, a portable computing device, other computing devices such as a personal computer, a laptop, or a desktop computer and/or any other suitable electronic device that will be apparent to those skilled in the relevant art(s). The computer 302 performs services that may include wireless communication, computing capabilities, and/or any other suitable functionality that will be apparent to those skilled in the relevant art(s). The computer 302 may also support services relating to computing capabilities, such as Short Message Service (SMS), electronic mail, Internet access, gaming, short range wireless communications, camera, Multimedia Messaging Service (MMS) messaging, digital audio player, radio, and Global Positioning System (GPS) services and/or any other suitable service that will be apparent to those skilled in the relevant art(s).

The computer 302 will receive and/or send data to the powerless/wireless peripheral devices 304.1 through 304.M when performing the services mentioned above. The powerless/wireless peripheral devices 304.1 through 304.M may include an alphanumeric keypad, an alphanumeric keyboard, a microphone, a mouse, a speaker, a computer monitor, a liquid crystal display (LCD) with or without a backlight, a printer and any other wireless peripheral devices capable of near field and/or far field communication that will be apparent to those skilled in the relevant art(s) without departing from the spirit and scope of the present invention.

For example, the computer 302 may represent a desktop computer in which the computer 302 performs services that include computing capabilities. The powerless/wireless peripheral device 304.1 may represent a computer monitor that displays to an operator, information resulting from the computing services provided by the computer 302. The powerless/wireless peripheral device 304.2 may represent a keyboard that enables the operator to input information into the computer 302 as the computer 302 performs the computing services. The powerless/wireless peripheral device 304.M may represent a mouse that further enables the operator to input information into the computer 302 as the computer 302 performs the computing services.

The computer 302 may communicate with the powerless/wireless peripheral devices 304.1 through 304.M through near field and/or far field communication 350. The computer 302 may transmit data through near field and/or far field communication 350 to the powerless/wireless peripheral devices 304.1 through 304.M. The powerless/wireless peripheral devices 304.1 through 304.M may also receive data from the operator and transmit the data to the computer 302 though the near field and/or far field communication 350.

For example, the powerless/wireless peripheral device 304.2 may represent a keyboard. The operator may input data into the powerless/wireless peripheral device 304.2 by entering key strokes into the powerless/wireless peripheral device 304.2. The data inputted into the powerless/wireless peripheral device 304.2 may be transmitted to the computer 302 through the near field and/or far field communication 350.

The powerless/wireless peripheral devices 304.1 through 304.M will also derive power from the power harvested by the near field and/or far field communication 350. The powerless/wireless peripheral device 304.1 through 304.M may derive power from the same channel using the same frequency as the wireless communication noted above. The powerless/wireless peripheral device 304.1 through 304.M may also derive power from a separate channel using a different frequency from that of the wireless communication.

The near field and/or far field communication 350 may harvest power from the magnetic field generated by the near field and/or far field communication 350 between the computer 302 and the powerless/wireless peripheral devices 304.1 through 304.M. As a result, the powerless/wireless peripheral devices 304.1 through 304.M do not require batteries. The powerless/wireless peripheral devices 304.1 through 304.M also do not require internal and/or external power supplies but may be powered solely by the harvested power generated from the near field and/or far field communication 350.

The powering of the powerless/wireless peripheral devices 304.1 through 304.M enables the powerless/wireless peripheral devices 304.1 through 304.M to be inexpensive, portable, and easy to use. Eliminating the need for a battery results in the powerless/wireless peripheral devices 304.1 through 304.M to be inexpensive by eliminating the cost of adding a battery. The powerless/wireless peripheral devices 304.1 through 304.M may be thin and foldable, thereby enabling the powerless/wireless peripheral devices 304.1 through 304.M to be portable. The powerless/wireless peripheral devices 304.1 through 304.M may be a standard sized keyboard that may be larger than the keypad on a wireless phone so that the powerless/wireless peripheral devices 304.1 through 304.M may be easy to use.

In engaging in near field and/or far field communication 350 with one or more powerless/wireless peripheral devices 304.1 through 304.M, the powerless/wireless peripheral device system 300 may include an addressing of the powerless/wireless peripheral devices 304.1 through 304.M. The addressing prevents interference between each of the powerless/wireless peripheral devices 304.1 through 304.M as each attempts to communicate with the computer 302 through the near field and/or far field communication 350. Each of the powerless/wireless peripheral devices 304.1 through 304.M may have its own identification address that can be read by the computer 302. The computer 302 also identifies the powerless/wireless peripheral devices 304.1 through 304.M by the identification address for each of the powerless/wireless peripheral devices 304.1 through 304.M.

In an example, the computer 302 wishes to engage in near field and/or far field communication 350 with the powerless/wireless peripheral device 304.M that represents the mouse. The computer 302 identifies the identification address of the powerless/wireless peripheral device 304.M and engages in near field and/or far field communication 350 with the powerless/wireless peripheral device 304.M based on that identification address. The computer 302 then reads the identification address of the powerless/wireless peripheral device 304.2 representing the keyboard when the computer 302 wishes to engage in near field and/or far field communication with the powerless/wireless peripheral device 304.2.

The computer 302 may engage in near field and/or far field communication 350 simultaneously with each of the powerless/wireless peripheral devices 304.1 through 304.M. The computer 302 may engage in near field and/or far field communication 350 in different frequency ranges with each of the powerless/wireless peripheral devices 304.1 through 304.M. For example, the computer 302 may communicate simultaneously with the powerless/wireless peripheral device 304.2 representing the keyboard and the powerless/wireless peripheral device 304.M representing the mouse. The computer 302 may simultaneously communicate with the keyboard 304.2 at a frequency in the low frequency (LF) band, such as 300 kHz to provide an example, and the mouse at a frequency in the high frequency (HF) band, such as 13.56 MHz to provide an example.

In another example, the computer 302 initially configures the powerless/wireless peripheral device 304.1 through 304.M to engage in near field and/or far field communication 350. The computer 302 writes the address of the powerless/wireless peripheral devices 304.1 through 304.M to a memory, such as an electrically erasable programmable read-only memory (EEPROM). The computer 302 writes the address of the powerless/wireless peripheral device 304.2 representing the keyboard to the memory of the computer 302, and engages in near field and/or far field communication 350 based on the address written to memory.

In another example, the computer 302 recognizes an identification address already preprogrammed into a memory of each of the powerless/wireless peripheral devices 304.1 through 304.M during manufacturing of the devices. The powerless/wireless peripheral devices 304.1 through 304.M communicate the preprogrammed identification addresses to the computer 102 during initial configuration, for future use.

In another example, two or more powerless/wireless peripheral devices 304.1 through 304.M may attempt to communicate with the computer 302 on the same band using the same frequency. In such an example, an ant-collision algorithm may be required to prevent interference between each of the devices during communication with the computer 302.

For example, the powerless/wireless peripheral devices 304.1 through 304.M may be communicating in the same frequency band. The powerless/wireless peripheral devices 304.1 through 304.M may not be equipped with unique identification addresses to identify each of the devices to the computer 302. In such an environment, an anti-collision algorithm may be incorporated in each of the powerless/wireless peripheral devices 304.1 through 304.M to prevent interference. An anti-collision algorithm, such as the ALOHA algorithm may be applied in addressing the powerless/wireless peripheral devices 304.1 through 304.M. Those skilled in the relevant art(s) will recognize that any anti-collision algorithm may be used without departing from the spirit and scope of the present invention.

A First Exemplary Powerless/Wireless Peripheral Device

Figure 4A:
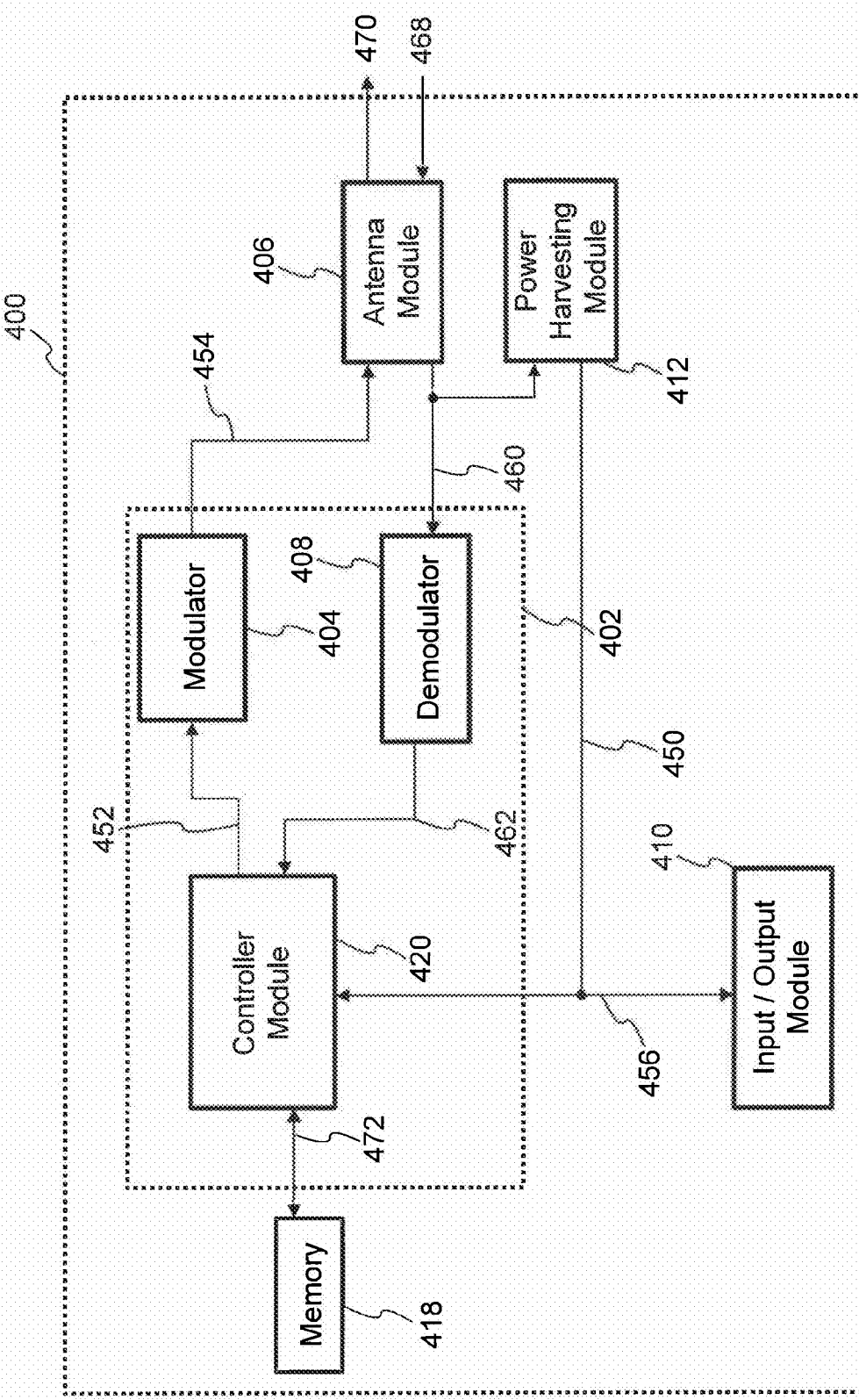
FIG. 4A illustrates a block diagram of a first powerless/wireless peripheral device according to an exemplary embodiment of the invention.

FIG. 4A illustrates a block diagram of a first powerless/wireless peripheral device 400 according to an exemplary embodiment of the invention. The powerless/wireless peripheral device 400 interacts with other powered wireless communications devices to exchange information, such as data and/or one or more commands to be executed to provide some examples. The powerless/wireless peripheral device 400 engages in wireless communication and receives power from the harvested power resulting from the wireless communication so that a battery is unnecessary. The powerless/wireless peripheral device 400 engages in wireless communication and harvests power on the same channel using the same frequency for both communication and power harvesting. The powerless/wireless peripheral device 400 includes a transceiver module 402, an antenna module 406, a power harvesting module 412, a memory 418, and an input/output module 410. The transceiver module 402 includes a controller module 420, a modulator 404, and a demodulator 408.

Although, the following description of the present invention is to be described in terms of NFC, those skilled in the relevant art(s) will recognize that the present invention may be applicable to other communications that use the near field and/or the far field. Those skilled in the relevant art(s) will recognize that the present invention may be applicable to frequency ranges included in both the near field and the far field that include low frequency (LF), high frequency (HF), ultra-high frequency (UHF) and radio frequency (RF) without departing from the spirit and scope of the present invention. For example, although the present invention is to be described using NFC capable devices, those skilled in the relevant art(s) will recognize that functions of these NFC capable devices may be applicable to other communications devices that use the near field and/or the far field including LF, HF, UHF, and RF without departing from the spirit and scope of the present invention.

The powerless/wireless peripheral device 400 may represent an alphanumeric keypad, an alphanumeric keyboard, a microphone, a mouse, a speaker, a computer monitor, a liquid crystal display (LCD) with or without a backlight, a printer and any other wireless peripheral devices capable of near field and/or far field communication that will be apparent to those skilled in the relevant art(s) without departing from the spirit and scope of the present invention.

In an example, the powerless/wireless peripheral device 400 may be a NFC capable device operating in a passive communication mode that interacts with another NFC capable device operating in an active communication mode to exchange information, such as data and/or one or more commands to provide some examples, between the devices.

During transmit to an external device, the information may be received from the input/output module 410 and sent to the transceiver module 402 as the input/output data 456. The transceiver module 402 modulates the input/output data 456 to provide the modulated data 454 to the antenna module 406. More specifically, the modulator 404 generates a radio frequency (RF) carrier and modulates transmission data 452 onto the RF carrier using any suitable analog or digital modulation technique to provide the modulated data 454. The suitable analog or digital modulation techniques may include but are not limited to: amplitude modulation (AM), frequency modulation (FM), phase modulation (PM), phase shift keying (PSK), frequency shift keying (FSK), amplitude shift keying (ASK), quadrature amplitude modulation (QAM) and/or any other suitable modulation technique that will be apparent to those skilled in the relevant art(s).

The antenna module 406 acting in passive mode may modulate magnetic fields generated by other NFC capable devices operating in active mode according to the modulated data 454 to provide the transmitted data communication 470. Typically, the antenna module 406 modulates these generated magnetic fields according to the modulated data 454 to provide the transmitted data communication 470. For example, the antenna module 406 converts the modulated data 454 which is typically current and/or voltage into a modulated communication signal to provide the transmitted data communication 470. In an embodiment, the modulator 404 may use a modulated backscattered technique by changing the antenna 406 impedance to send modulated data 470 to an external device. In other words, the external NFC device generates the magnetic field that is backscattered to the same external NFC device, where the level of backscattered energy is determined by the impedance of antenna module 406, and where the impedance the impedance of antenna module 406 is modulated by modulator 404 to provide transmitted communications signal 470.

During receive, antenna module 406 may receive a communications signal 468 that is generated by another NFC capable device and that is inductively coupled onto the inductive coupling element of the antenna module 406, thereby providing a recovered communications signal 460. For example, other NFC capable devices, operating in active mode, may apply their corresponding information to a magnetic field that is inductively coupled to the antenna module 406, represented as the received communications signal 468. In response thereto, the antenna module 406 converts the received communications signal 468 into a current and/or voltage to provide the recovered communications signal 460 that is provided to the transceiver 402 and power harvesting module 412 in parallel manner as signals 460.1 and 460.2.

The power harvesting module 412 may derive or harvest power from the recovered communications signal 460 for the input/output module 410 and the controller module 420. The harvested power may include sufficient power to adequately operate the input/output module 410 and the transceiver module 402, thereby eliminating the need for a battery. Specifically, the power harvesting module 412 rectifies and/or regulates the recovered communications signal 460 to provide harvested power 450. The harvested power 450 may represent a charging voltage and/or a charging current that is directly used to power the input/output module 410 and the controller module 420.

The demodulator 408 receives the recovered communications signal 460 from the antenna module 406, substantially in parallel with that received by the power harvesting module 412. The demodulator 408 demodulates the recovered communications signal 460 using any suitable analog or digital demodulation technique to provide recovered information 462. The suitable analog or digital demodulation technique may be based on the type of modulation that was used including: amplitude modulation (AM), frequency modulation (FM), phase modulation (PM), phase shift keying (PSK), frequency shift keying (FSK), amplitude shift keying (ASK), quadrature amplitude modulation (QAM) and/or any other suitable modulation technique that will be apparent to those skilled in the relevant art(s).

The controller module 420 controls operation of the powerless/wireless peripheral device 400. Additionally, the controller module 420 processes the recovered information 462. For example, the controller module 420 may issue and/or execute one or more commands embedded within the recovered information 462. The one or more commands may include a transmission power, a transmission data rate, a transmission frequency, a modulation scheme, a bit and/or a byte encoding scheme and/or any other suitable operation parameter for the powerless/wireless peripheral device 400 that will be apparent to those skilled in the relevant art(s) without departing from the spirit and scope of the invention, of other wireless communications devices. Further, the controller module 420 may store the recovered information 462, or a derivation thereof after processing, as data 472 in memory 418. Further, the controller module 420 may route the recovered information 462 to the input/output module 410 for further processing, such as display when the input/output module is a display module.

As another example, the controller module 420 may format the recovered information 462 into data frames for transmission to other wireless communications capable devices and may perform error decoding, such as cyclic redundancy check (CRC) to provide an example, on the data frames to provide the transmission data 452. The data frames may include frame delimiters to indicate a start and/or an end of each of the data frames. As a further example, the controller module 420 may parse the input/output data 456 and/or the data 472 from the recovered information 462. The recovered information 462 may include a header of one or more bits as part of the information. The one or more bits of the header may be interpreted by the controller module 420 to determine whether to route the recovered information 462 as input/output data 456 to the input/output module 410, and/or as data 472 to be stored in the memory 418.

The memory 418 reads and/or writes the data 472. The memory 418 may include a data store such as a transponder, a tag, a smartcard, read only memory (ROM), EEPROM, random access memory (RAM), magnetic disk storage media, optical storage media, flash memory devices and/or any other suitable machine-readable medium that will be apparent to those skilled in the relevant art(s) without departing from the spirit and scope of the invention.

When the input/output module 410 performs input functions (e.g. keyboard), the input/output module 410 routes information, such as one or more commands and/or data, from an operator as the input/output data 456 to the controller module 420. For example, the input/output module 410 receives inputted information from the operator and provides the input/output data 456 to the controller module 420. The input/output data 456 may be an electrical signal generated by the physical keystrokes entered by the operator. Alternatively, the input/output data 456 may be a representative indicator of the key strokes that the operator entered into the input/output module 410, such as digital bits or words that represent one or more keystrokes. Therefore, the indicator may include multiple encoded bits that are representative of the actual key strokes that are represented by the input/output data 456.

The controller module 420 translates the input/output data 456 so that the input/output data 456 may be properly formatted to provide the transmission data 452. Specifically, the controller module 420 encodes the input/output data 456 so that the input/output data 456 may be read as the transmission data 452. Those skilled in the relevant art(s) will recognize that the controller module 420 may encode the input/output data 456 into ASCII characters, row and column information, unique identifications for each keystroke, and/or any other encoding method without departing from the spirit and scope of the present invention.

In a further example, the input/output data 456 includes individual identification addresses for each input provided by the operator to be read as the transmission data 452 rather than encoding the input/output data 456. Specifically, each touch and/or keystroke by the operator includes an individual identification address so that the input/output data 456 represents the individual identification address for each individual touch and/or keystroke. The transmission data 452 in turn includes each individual identification address formatted to be modulated.

The input/output module 410 provides the operator with the capability to interact with the powerless/wireless peripheral device 400. In embodiments, the capabilities may include but not limited to inputting data by entering keystrokes, inputting data by clicking, inputting data by voice, outputting data by sound, outputting visual data and/or any other suitable interaction that will be apparent to those skilled in the relevant art(s) without departing from the spirit and scope of the present invention.

When the input/output module 410 operates as an output device (e.g. display), then it receives the input/output data 456 from the transceiver module 402. The input/output data 456 may represent data to be transmitted or displayed to the operator by the input/output module 410, and/or one or more commands to be executed by the input/output module 410.

When the input/output device 410 operates as an input device, the input/output device 410 may be or represent alphanumeric keys, a voice receiver, a button that may be compressed, a roller enabling the operator to scroll, a sensor that detects the location of a peripheral device enabling the operator to maneuver the peripheral device, and other suitable devices that enable the operator to input and/or receive data from the peripheral device.

A Second Exemplary Powerless/Wirelss Peripheral Device

Figure 4B:
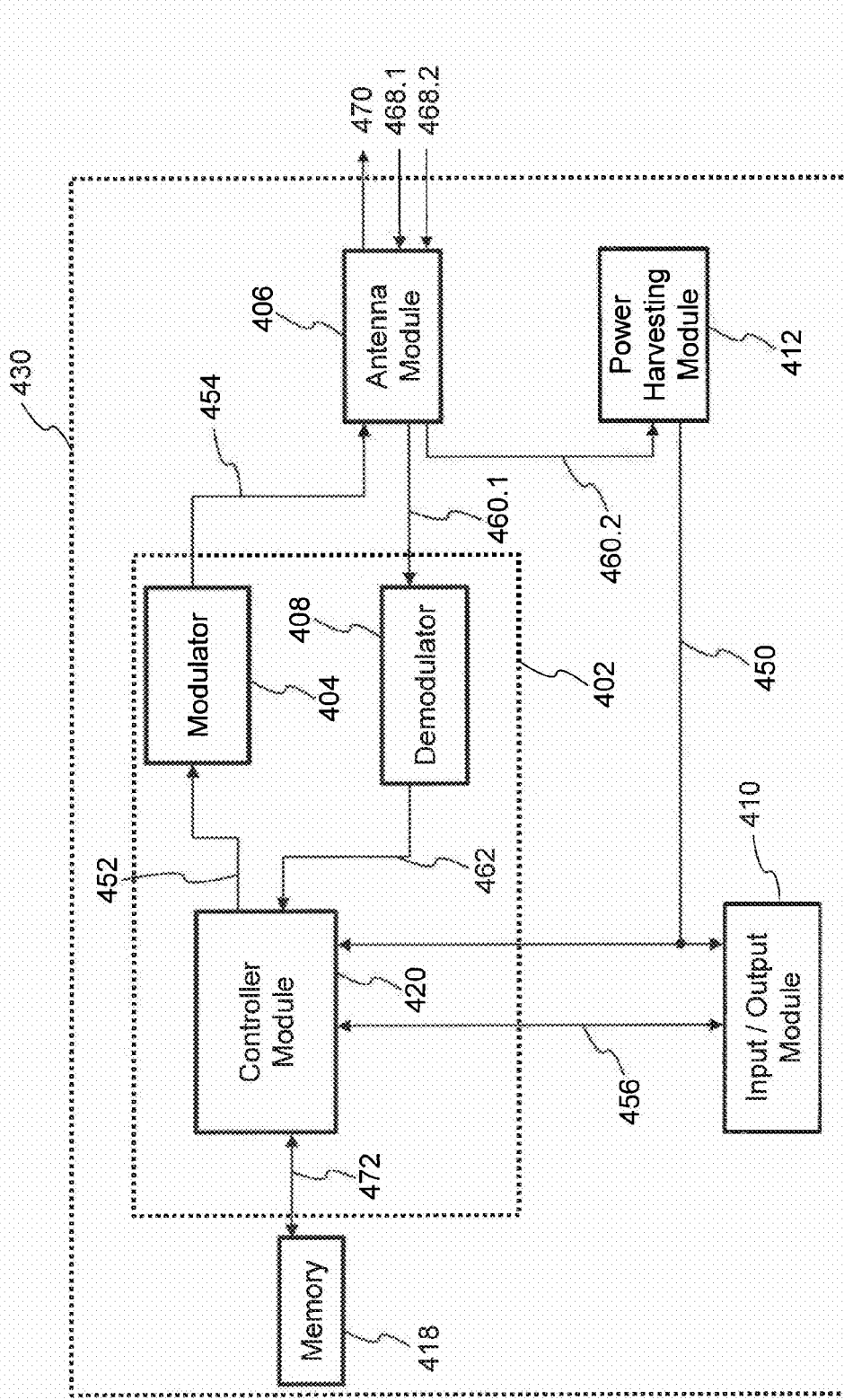
FIG. 4B illustrates a block diagram of a second powerless/wireless peripheral device according to an exemplary embodiment of the invention.

FIG. 4B illustrates a block diagram of a second powerless/wireless peripheral device 430 according to an exemplary embodiment of the invention. Similar to FIG. 4A, the powerless/wireless peripheral device 430 engages in wireless communication, and harvests power from the wireless communication so that a battery is unnecessary. However, in this exemplary embodiment, the powerless/wireless peripheral device 430 uses a different channel having a different frequency to engage in wireless communication from the channel and frequency that are used to harvest power.

The powerless/wireless peripheral device 430 includes the transceiver module 402, the antenna module 406, the power harvesting module 412, the memory 418, and an input/output module 410. The transceiver module 402 may include a controller module 420, a modulator 404, and the demodulator 408. The powerless/wireless peripheral device 430 shares many similar features with the powerless/wireless peripheral device 400; therefore, only the differences between the powerless/wireless peripheral device 400 and the powerless/wireless peripheral device 430 are to be discussed in further detail.

The powerless/wireless peripheral device 430 may use separate channels with different frequencies to engage in wireless communication and to harvest power. The powerless/wireless peripheral device 430 may engage in wireless communication on a first channel using a first frequency. The powerless/wireless peripheral device 430 may harvest power from a second channel using a second frequency that is different from the first channel and first frequency.

For example, the powerless/wireless peripheral device may engage in far field communication with a far field communication capable device. The powerless peripheral device may engage in wireless communication with the far field communication capable device using a frequency in the UHF band, and may harvest power from the far field communication device using a frequency in the HF band. Those skilled in the relevant art(s) will recognize that the present invention may be applicable to frequency ranges included in both the near field and the far field that include LF, HF, UHF, and RF without departing from the spirit and scope of the present invention.

Near field and/or far field capable devices may inductively couple a received communications signal 468.1 and 468.2 onto the inductive coupling element of the antenna module 406 to provide a recovered communications signal 460.1 and 460.2. The received communications signal 468.1 represents a received communications signal from a near field and/or far field capable device operating on a first channel at a first frequency. The received communications signal 468.2 represents a received communications signal from a near field and/or far field capable device operating on a second channel at a second frequency. The first channel and the first frequency differ from the second channel and the second frequency.

The received communications signal 460.1 represents a recovered communications signal operating on the first channel at the first frequency. The received communications signal 460.1 may represent a communications signal to be demodulated and providing the recovered information representing the wireless communication. The received communications signal 460.2 represents a recovered communications signal operating on the second channel at the second frequency. The received communications signal 460.2 may represent a communications signal to harvest power from.

For example, near field and/or far field capable devices in the active mode may generate magnetic and/or electric fields which are inductively coupled onto the antenna module 406. The corresponding information that is inductively coupled corresponds to the received communications signal 468.1 and the received communications signal 468.2. The antenna may include communication signal filters to properly filter the corresponding received signals into the received communications signal 468.1 and the received communications signal 468.2. For example, the antenna module 406 converts the received communications signal 468.1 and the received communications signal 468.2 into a current and/or voltage to provide the recovered communications signal 460.1 and the recovered communications signal 460.2.

The power harvesting module 412 may derive or harvest power from the recovered communications signal 460.2, which is then provided to the input/output module 410 and the transceiver module 402. The harvested power may include sufficient power to adequately operate the input/output module 410 and the controller module 420 eliminating the need for a battery. Specifically, the power harvesting module 412 rectifies and/or regulates the recovered communications signal 460.2 to provide the harvested power 450. The harvested power 450 may represent a charging voltage and/or a charging current that is directly used to power the input/output module 410 and the controller module 420.

The demodulator 408 receives the recovered communications signal 460.1 from the antenna module 406. The demodulator 408 demodulates the recovered communications signal 460.1 using any suitable analog or digital demodulation technique to provide recovered information 462. The suitable analog or digital demodulation technique may be based on: amplitude modulation (AM), frequency modulation (FM), phase modulation (PM), phase shift keying (PSK), frequency shift keying (FSK), amplitude shift keying (ASK), quadrature amplitude modulation (QAM) and/or any other suitable demodulation technique that will be apparent to those skilled in the relevant art(s).

In an example, the received communications signal 468.1 represents a received communications signal operating at a frequency in the LF band. The received communications signal 468.2 represents a received communications signal operating at a frequency in the HF band. The antenna module 406 filters the corresponding information from the near field and/or far field capable devices into the received communications signal 468.1 in the LF band and the received communications signal 468.2 in the HF band.

The antenna module 406 converts the received communications signal 468.1 in the LF band into the recovered communications signal 460.1. The recovered communications signal 460.1 may be demodulated by the demodulator 408 to provide recovered information 462. The antenna module 406 converts the received communications signal 468.2 in the HF band into the recovered communications signal 460.2. The recovered communications signal 460.2 may be rectified and/or regulated to provide the harvested power 450.

A First Exemplary Powerless/Wireless Keyboard

Figure 5A:
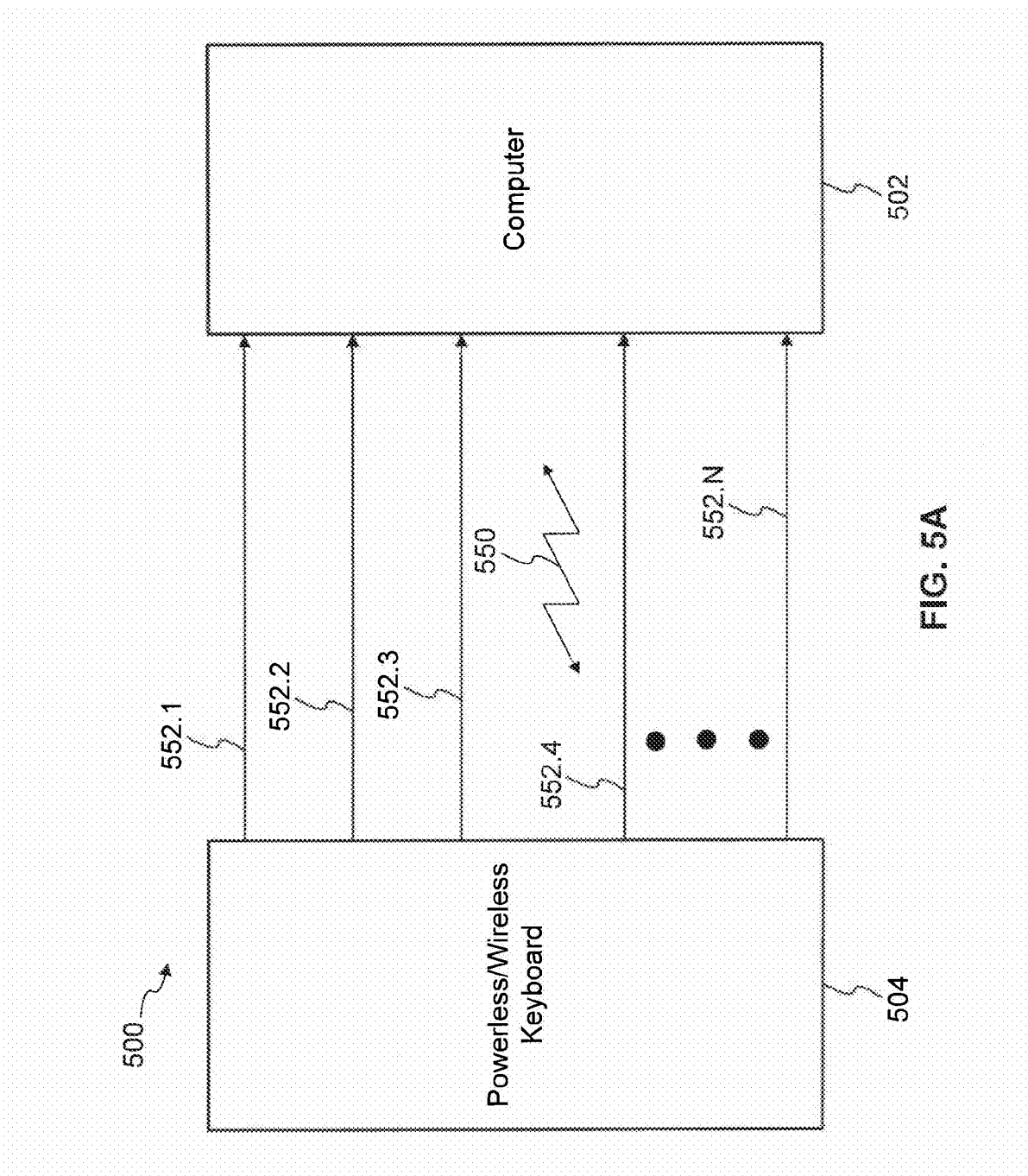
FIG. 5A illustrates a block diagram of a first powerless/wireless keyboard system according to an exemplary embodiment of the invention.

FIG. 5A illustrates a block diagram of a first powerless/wireless keyboard system 500 according to an exemplary embodiment of the invention. As discussed above, the powerless/wireless keyboard 504 engages in wireless communication and receives power from the harvested power resulting from the wireless communication so that a battery is unnecessary, similar to that described for FIGS. 4A and 4B. The powerless/wireless keyboard system 500 includes a powerless/wireless keyboard 504 that receives data from the operator and provides that data to the computer 502 via the wireless communication.

Near field and/or far field communication 550 enables wireless communication between the computer 502 and the powerless/wireless keyboard 504. The near field and/or far field communication 550 also enables the powerless/wireless keyboard 504 to receive power from the power harvested from the near field and/or far field communication 550. The powerless/wireless keyboard 504 may engage in the wireless communication and receive harvested power from the near field and/or far field communication 550 on a single channel using a single frequency for both the wireless communication and the harvested power. Alternatively, the powerless/wireless keyboard 504 may engage in the wireless communication on a first channel and corresponding frequency, and use a second channel and corresponding frequency to receive the harvested power, where the first channel and frequency are different from the second channel and frequency. In either alternative, the powerless/wireless keyboard 504 does not require battery power.

The powerless/wireless keyboard 504 receives a plurality of inputs provided by the operator. The powerless/wireless keyboard formats the plurality of inputs provided by the operator into input data 552.1, 552.2, 552.3, 552.4, and 552.N where in N is an integer greater than or equal to 1. The powerless/wireless keyboard 504 provides the input data 552.1 through 552.N to the computer 502 via the near field and/or far field communication 550.

Specifically, the powerless/wireless keyboard 504 receives keystrokes provided by the operator as the operator compresses each of the keys on the powerless/wireless keyboard 504. Each of the keys included on the powerless/wireless keyboard 504 includes an individual identification address specific to the each key included on the powerless/wireless keyboard 504. As the operator compresses each of the keys on the powerless/wireless keyboard 504, the powerless/wireless keyboard provides the input data 552.1 through 552.N that corresponds to the individual identification address for each key compressed to the operator to the computer 502.

For example, the keys "a", "b", "c", "d", and "e" each have an individual identification address that corresponds to input data 552.1, 552.2, 552.3, 552.4, and 552.N respectively. As the operator compresses the key "a", the powerless/wireless keyboard 504 provides the input data 552.1 that corresponds to the individual identification address for "a" to the computer 502. As the operator compresses the key "b", the powerless/wireless keyboard 504 provides the input data 552.2 that corresponds to the individual identification address for "b" to the computer 502. As the operator compresses the key "c", the powerless/wireless keyboard 504 provides the input data 552.3 that corresponds to the individual identification address "c" to the computer 502. As the operator compresses the key "d", the powerless/wireless keyboard 504 provides the input data 552.4 that corresponds to the individual identification address "d" to the computer 502. As the operator compresses the key "e", the powerless/wireless keyboard 504 provides the input data 552.N that corresponds to the individual identification address "e" to the computer 502.

Those skilled in the relevant art(s) will recognize that the keyboard may include an arrangement of buttons and/or keys that act as mechanical levers and/or switches. Those skilled in the relevant art(s) will also recognize that the keyboard may include a switching keyboard, capacitive keyboard, resistive keyboard and/or any other keyboard technology without departing from the spirit and scope of the present invention.

A Second Exemplary Powerless/Wireless Keyboard

Figure 5B:
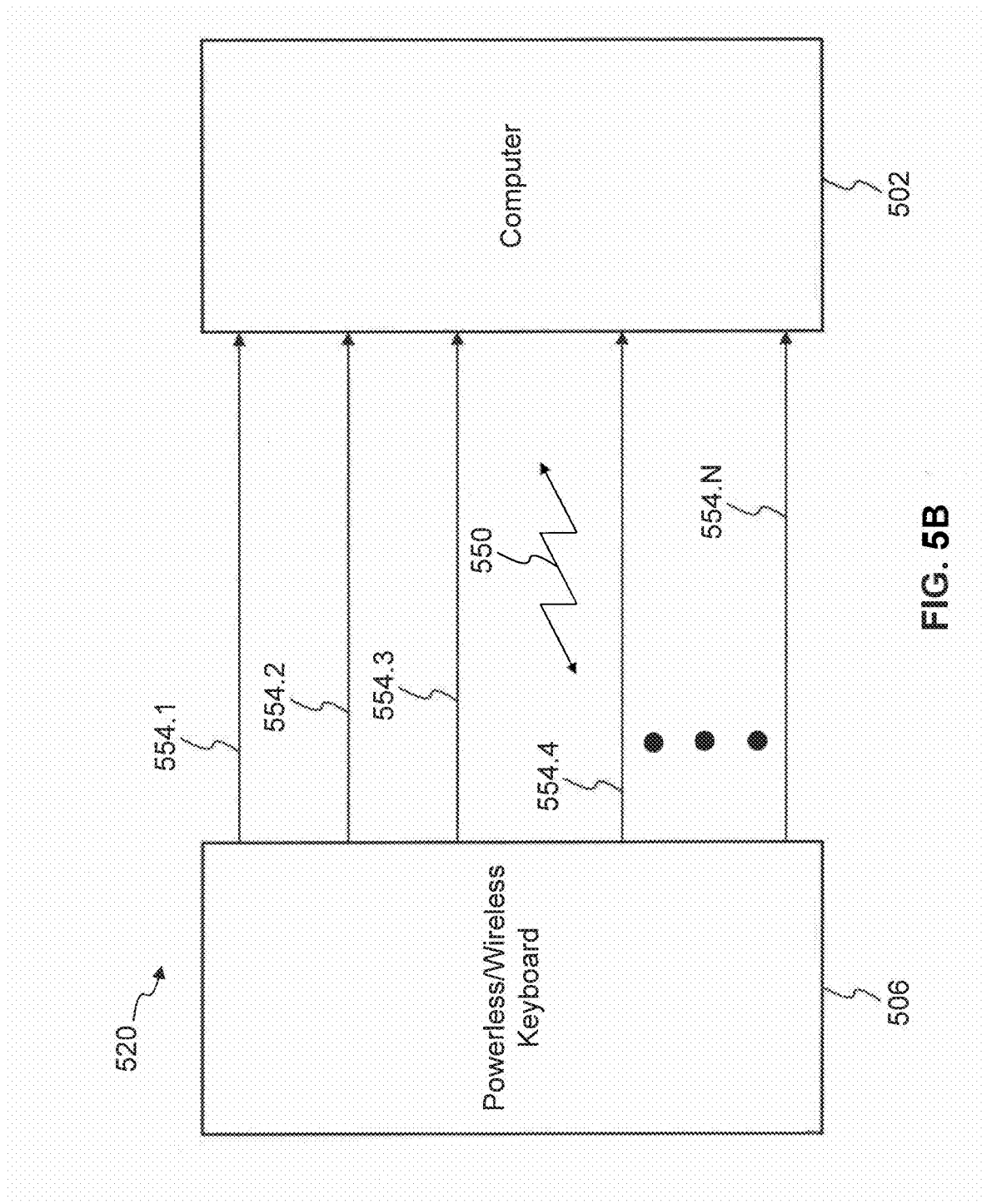
FIG. 5B illustrates a block diagram of a second powerless/wireless keyboard system according to an exemplary embodiment of the invention.

FIG. 5B illustrates a block diagram of a second powerless/wireless keyboard system 520 according to an exemplary embodiment of the invention. The powerless/wireless keyboard system 500 includes the powerless/wireless keyboard 504 that provides an individual identification address for each key compressed by the operator to the computer 502. However, unlike the powerless/wireless keyboard system 500, the powerless/wireless keyboard 506 included in the powerless/wireless keyboard system 520 encodes the data received from each key compressed to the operator.

The powerless/wireless keyboard 506 receives a plurality of inputs provided by the operator. The powerless/wireless keyboard translates the plurality of inputs so that the plurality of inputs may be properly formatted into input data 554.1, 554.2, 554.3, 554.4, and 554.N where N is an integer greater than or equal to 1. The powerless/wireless keyboard 504 provides the input data 554.1 through 552.N to the computer via the near field and/or far field communication 550.

Specifically, the powerless/wireless keyboard 506 encodes the keystrokes resulting from the operator compressing each of the keys into a data format that represents each of the keys. For example, as the operator compresses the key "a", the data resulting from that compression may be encoded by the powerless/wireless keyboard 506 into the ASCII character for "a". The powerless/wireless keyboard 506 provides the input data 554.1 representing the ASCII character for "a" to the computer 502 via the near field and/or far field communication 550. Those skilled in the relevant art(s) will recognize that the powerless/wireless keyboard 506 may encode each of the compressed keys by the operator into ASCII characters, row and column information, unique identifications for each keystroke, and/or any other encoding method without departing from the spirit and scope of the present invention.

An Exemplary Operational Control Flow of the Controller Module

Figure 6:
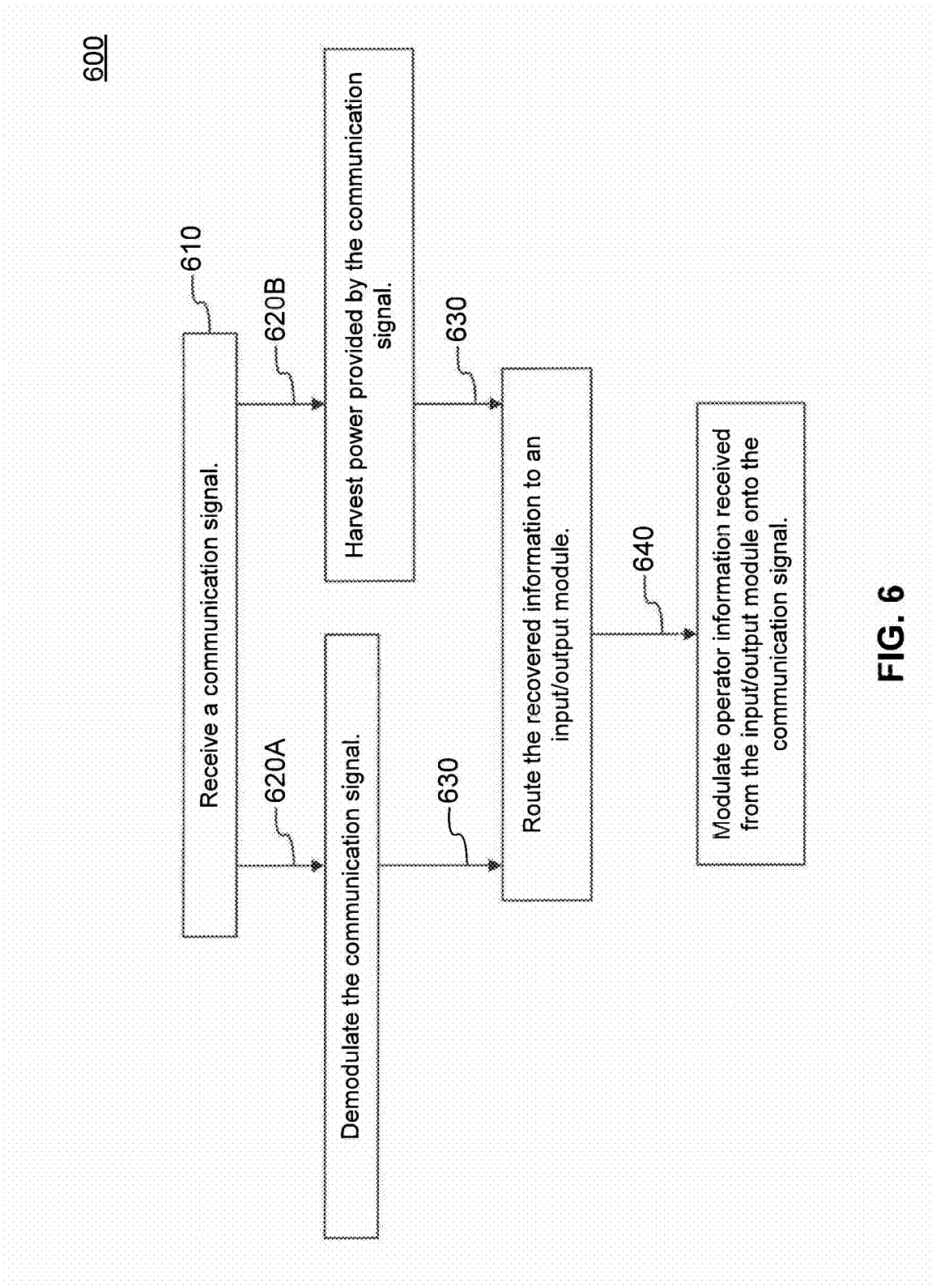
FIG. 6 is a flowchart of exemplary operational steps of the controller module according to an exemplary embodiment of the present invention.

FIG. 6 is a flowchart of exemplary operational steps 600 of the controller module according to an exemplary embodiment of the present invention. The invention is not limited to this operational description. Rather, it will be apparent to persons skilled in the relevant art(s) from the teachings herein that other operational control flows are within the scope and spirit of the present invention. The following discussion describes the steps in FIG. 6.

At step 610, the operational control flow receives a communications signal, such as received communications signal 468, to provide an example, from a NFC capable device and/or a far field communication capable device. The operational control flow provides a recovered communications signal, such as recovered communications signal 460, to provide an example, from the received communications signal.

The operational control flow performs steps 620A and 620B simultaneously. At step 620A, the operational control flow demodulates the recovered communications signal, such as the recovered communications signal 460 to provide an example. The operational control flow demodulates the recovered communications signal using any suitable analog or digital demodulation technique. The suitable analog or digital modulation technique may be based on: amplitude modulation (AM), frequency modulation (FM), phase modulation (PM), phase shift keying (PSK), frequency shift keying (FSK), amplitude shift keying (ASK), quadrature amplitude modulation (QAM) and/or any other suitable modulation technique that will be apparent to those skilled in the relevant art(s).

At step 620B, the operational control flow harvests power from the recovered communications signal such as, recovered communications signal 460, to provide an example. The operational control flow derives or harvests power from the recovered communications signal generated by NFC and/or far field communication. The harvested power is sufficient to reliably operate the powerless/wireless peripheral device, such as the powerless/wireless peripheral device 400, to provide an example.

The operational control flow for steps 620A and 620B may demodulate the recovered communications signal and harvest power from the recovered communication single on a single channel using a single frequency for both the demodulation and the harvested power. Alternatively, the operational control flow for steps 620A and 620B may demodulate the communication signal and harvest power from the recovered communications signal on different respective channels and using different respective frequencies for the demodulation and the harvested power.

At step 630, the operational control flow routes information that results from the demodulation, such as input/output data 456, to provide an example, to an input/output module, such as input/output module 410, to provide an example. The operational control flow encodes the information to format the information for the input/output module to provide to an operator.

At step 640, the operational control flow modulates operator information received by the input/output module onto a communication signal, to produce modulated data. For example, operator information 456 is modulated onto a carrier signal to produce modulated data 454 in FIG. 4A. The operational control flow modulates the operator information using the suitable analog or digital modulation technique that may include amplitude modulation (AM), frequency modulation (FM), phase modulation (PM), phase shift keying (PSK), frequency shift keying (FSK), amplitude shift keying (ASK), quadrature amplitude modulation (QAM) and/or any other suitable modulation technique that will be apparent to those skilled in the relevant art(s).

CONCLUSION

It is to be appreciated that the Detailed Description section, and not the Abstract section, is intended to be used to interpret the claims. The Abstract section may set forth one or more, but not all exemplary embodiments, of the invention, and thus, are not intended to limit the invention and the appended claims in any way.

The invention has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the invention. Thus the invention should not be limited by any of the above-described exemplary embodiments, but should be defined only in accordance with the following claims and their equivalents.

What is claimed is:

1. A wireless peripheral device to communicate wirelessly with a powered device, the wireless peripheral device comprising:
    an input/output module configured to receive operator information via an input interface;
    a transceiver module configured to receive a communication signal from the powered device, and to modulate a transmission signal using the operator information;
    a controller module configured to translate the operator information, so as to format an identification address for each portion of the operator information prior to being modulated onto the transmission signal; and
    a power harvesting module configured to harvest power from the communication signal, and to provide the harvested power to the transceiver module and to the input/output module.

2. The wireless peripheral device of claim 1, further comprising:
    an antenna module configured to generate a field for the communication signal.

3. The wireless peripheral device of claim 2, wherein the power harvesting module harvests the harvested power from a magnetic field generated by near field communication (NFC) between the antenna module and the powered device, the powered device being an NFC device.

4. The wireless peripheral device of claim 2, wherein the power harvesting module harvests the harvested power from an electric field generated by far field communication between the antenna module and the powered device, the powered device being a far field communication device.

5. The wireless peripheral device of claim 1, wherein the wireless peripheral device is implemented as a keyboard.

6. The wireless peripheral device of claim 1, wherein the transceiver module is further configured to demodulate information recovered from the communication signal, and to route the demodulated information to the input/output module.

7. The wireless peripheral device of claim 1, wherein the wireless peripheral device includes an address that identifies the wireless peripheral device to a wireless peripheral device controller.

8. A method for engaging in wireless communication by a wireless peripheral device, the method comprising:
receiving a communication signal from a powered device;
receiving operator information at an input/output module via an input interface;
modulating a transmission signal with the operator information, wherein the modulating includes translating the operator information so as to format an identification address for each portion of the operator information prior to being modulated onto the transmission signal; and
harvesting power provided by the communication signal.

9. The method of claim 8, further comprising:
demodulating information recovered from the communication signal;
routing the demodulated information to the input/output module; and
receiving the operator information by the input/output module.

10. The method of claim 9, wherein the demodulating the information recovered from the communication signal further comprises encoding the information recovered from the communication signal so as to format the information recovered from the communication signal.

11. The method of claim 8, wherein the harvesting further comprises harvesting power from a magnetic field generated by near field communication (NFC) between the wireless peripheral device and an NFC device.

12. The method of claim 8, wherein the harvesting further comprises harvesting power from an electric field generated by far field communication between the wireless peripheral device and a far field communication device.

13. The method of claim 8, wherein the receiving the communication signal further comprises receiving a first communication signal operating at a first frequency and receiving a second communication signal operating at a second frequency.

14. A wireless peripheral device to communicate wirelessly with a powered device, the wireless peripheral device comprising:
an input/output module configured to receive operator information via an input interface;
a transceiver module configured to receive a first communication signal operating at a first frequency and to receive a second communication signal operating at a second frequency, and to modulate the first communication signal with the operator information; and
a power harvesting module configured to harvest power from the second communication signal, wherein the harvested power is provided to the transceiver module and to the input/output module.

15. The wireless peripheral device of claim 14, further comprising:
a controller module configured to translate the operator information, so as to format the operator information prior to being modulated onto the first communication signal.

16. The wireless peripheral device of claim 14, further comprising:
an antenna module configured to generate a field for the first and second communication signals.

17. The wireless peripheral device of claim 14, wherein the power harvesting module harvests the harvested power from a magnetic field generated by near field communication (NFC) between the antenna module and the powered device, the powered device being an NFC device.

18. The wireless peripheral device of claim 14, wherein the power harvesting module harvests the harvested power from an electric field generated by far field communication between the antenna module and the powered device, the powered device being a far field communication device.

19. The wireless peripheral device of claim 14, wherein the transceiver module is further configured to demodulate information recovered from the first communication signal, and to route the demodulated information to the input/output module.

20. The wireless peripheral device of claim 14, wherein the wireless peripheral device is implemented as a keyboard.

* * * * *